I. P. LEETE.
ATOMIZER.
No. 108,710. Patented Oct. 25, 1870.
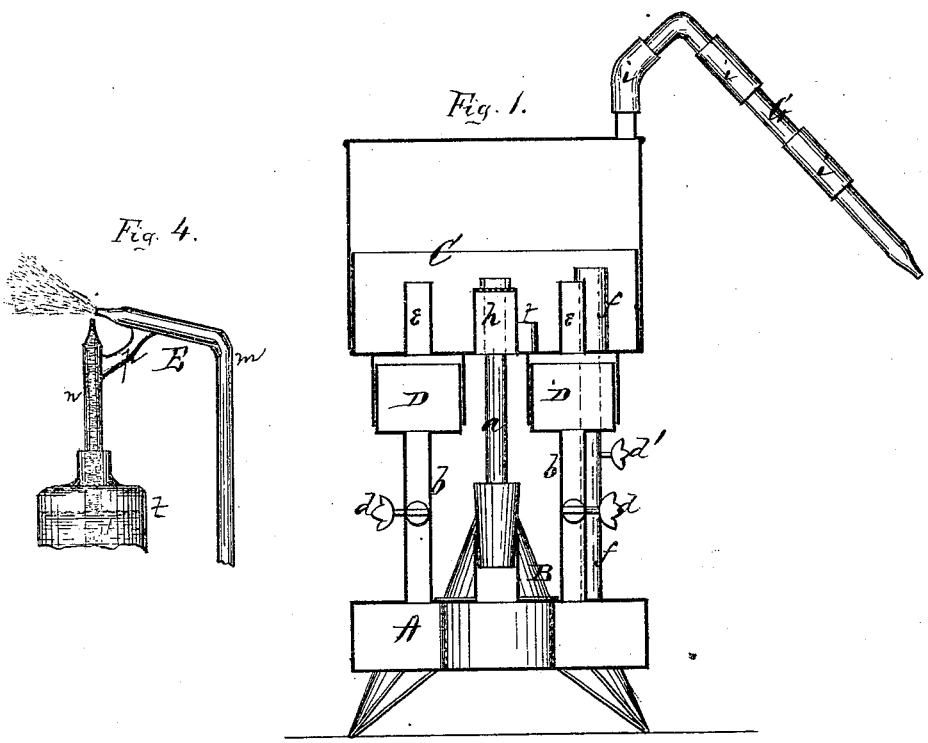
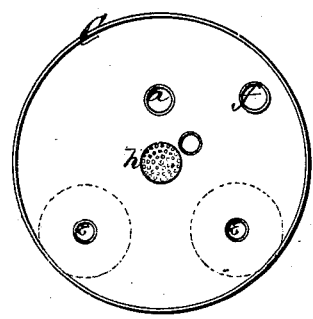
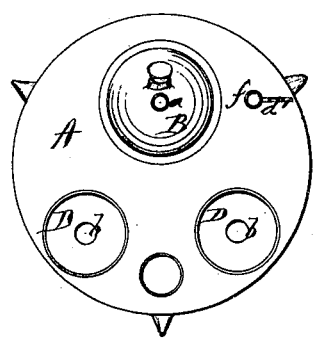
Witnesses:
Chas Jacobs
C. W. White
Inventor:
Isaac P. Leete.
Per
T. H. Alexander
Atty.

United States Patent Office.

ISAAC P. LEETE, OF PHILADELPHIA, PENNSYLVANIA.

Letters Patent No. 108,710, dated October 25, 1870.

IMPROVEMENT IN STEAM ATOMIZERS.

The Schedule referred to in these Letters Patent and making part of the same.

*To all whom it may concern:*

Be it known that I, ISAAC P. LEETE, of Philadelphia, in the county of Philadelphia and State of Pennsylvania, have invented certain new and useful Improvements in Vaporometers; and I do hereby declare that the following is a full, clear, and exact description thereof, reference being had to the accompanying drawing and to the letters of reference marked thereon, which form a part of this specification.

The nature of my invention consists in the construction and arrangement of a "vaporometer" for the formation of oxygenated medicated vapors, and atomizing fluids within a chamber from which they are to be inhaled.

In order to enable others skilled in the art to which my invention appertains to make and use the same, I will now proceed to describe its construction and operation, referring to the annexed drawing, in which—

Figure 1 is a vertical section of the entire vaporometer;

Figure 2 is a plan view of the inside of the receiving-chamber;

Figure 3 is a plan view of the boiler, with its several attachments; and

Figure 4 is an enlarged side view of the atomizer.

A represents a boiler, of any suitable dimensions, through which is an aperture for the insertion of the retort B.

From the upper end of the retort B a pipe, $a$, leads upward into the receiving-chamber C.

From the boiler A, pipes $b\ b$, lead into smaller chambers, D D, and from said chambers, pipes, $e\ e$, lead up into the receiving-chamber C.

A single pipe, $f$, leads direct from the boiler up into the receiving-chamber; and on said pipe, within the chamber, is placed the atomizer E.

The pipes $b$, $b$, and $f$ are provided with stop-cocks, $d$, $d$, and $d'$, respectively.

In the center of the bottom of the receiving-chamber C is a small tube, $h$, leading upward for a short distance, the upper end of which tube is provided with a perforated cover, as shown in fig. 2.

From the top of the receiving-chamber C leads a glass or metallic tube, G, provided with flexible joints, $i\ i$, through which tube the vapors are inhaled.

The chambers D D may be filled with sponge or other porous substance that will hold the medicine to be converted into vapor; or, when the article is of so volatile a nature that it can be converted into vapor by the steam passing among vials containing the medicine, such vial may be placed in the said chambers; or, crude medicines, whose virtues can be extracted by steam, may be placed in said chambers, the vapors or essential properties being conveyed to the receiving-chamber C.

The atomizer E is composed of a curved tube, $m$, and a straight one, $n$, connected by a brace, $p$.

The curved tube $m$ is placed on the steam-pipe $f$, within the receiving-chamber, and the lower end of the straight tube $n$ is placed in the medicine contained in a receptacle, $t$.

The steam passing across the upper end of tube $n$ creates a vacuum, and said tube is at once filled from the contents of the receptacle $t$.

The force of the steam shatters the medicines thus brought to the upper end of tube $n$ into a spray or mist, as shown in fig. 4.

The various uses to which my apparatus can be put may be summed up as follows:

First, by charging the retort B with the material for generating oxygen and closing stop-cocks, $d\ d\ d'$, the receiving-chamber C will be filled with pure oxygen, which can be inhaled with atmospheric air admitted through the perforated tube or opening $h$.

Second, by then opening stop-cock $d'$ atomized medicines may be inhaled with the oxygen.

Third, by lifting the retort B so as to rest on the upper margin of the boiler A, I administer atomized medicines without the oxygen.

Fourth, without removing the retort from the position last mentioned and closing stop-cock $d'$, I open stop-cocks, $d\ d$, and have medicated vapor.

Fifth, restore the retort B to the position indicated in the drawing, and the result is oxygenized medicated vapor.

Sixth, with the stop-cocks and retort in the position mentioned under 4 and 5, and opening the stop-cock $d'$, the chamber C is filled with medicated vapor, oxygen, and atomized medicines.

Having thus described my invention,

What I claim as new, and desire to secure by Letters Patent, is—

1. The boiler A, provided with the retort B, in combination with the receiving-chamber C, substantially as and for the purposes herein set forth.

2. In combination with the boiler A and chamber C, the chambers D D, arranged substantially as shown and described, and for the purposes herein set forth.

3. The atomizer E within the receiving-chamber C, substantially as and for the purposes herein set forth.

In testimony that I claim the foregoing as my own, I affix my signature in presence of two witnesses.

ISAAC P. LEETE.

Witnesses:
EZRA STOKES,
WM. A. BALDWIN.